US008980358B2

(12) United States Patent
Quail et al.

(10) Patent No.: US 8,980,358 B2
(45) Date of Patent: Mar. 17, 2015

(54) FROZEN AERATED CONFECTIONS AND METHODS FOR PRODUCTION THEREOF

(75) Inventors: Patricia Jill Quail, Sharnbrook (GB); Jeffrey Underdown, Sharnbrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 1886 days.

(21) Appl. No.: 11/975,485

(22) Filed: Oct. 19, 2007

(65) Prior Publication Data

US 2008/0220141 A1     Sep. 11, 2008

(30) Foreign Application Priority Data

Oct. 19, 2006    (EP) .................................. 06122552

(51) Int. Cl.
*A23G 9/32* (2006.01)
*A23G 9/38* (2006.01)
*A23G 9/04* (2006.01)
*A23G 9/40* (2006.01)

(52) U.S. Cl.
CPC .. *A23G 9/38* (2013.01); *A23G 9/04* (2013.01); *A23G 9/32* (2013.01); *A23G 9/327* (2013.01); *A23G 9/40* (2013.01)
USPC ............................ 426/565; 426/660; 426/601

(58) Field of Classification Search
USPC .................................. 426/565, 601, 607, 660
See application file for complete search history.

(56) References Cited

U.S. PATENT DOCUMENTS

| | | | |
|---|---|---|---|
| 3,003,882 A | | 10/1961 | Peat |
| 3,183,098 A | * | 5/1965 | Baur ............................ 426/567 |
| 3,345,184 A | | 10/1967 | Nelson |
| 3,949,102 A | | 4/1976 | Hellyer |
| 4,244,981 A | | 1/1981 | Blake |
| 4,335,155 A | | 6/1982 | Blake |
| 4,368,211 A | | 1/1983 | Blake |
| 4,725,445 A | * | 2/1988 | Ferrero ........................ 426/565 |
| 4,737,372 A | | 4/1988 | Bender |
| 4,853,243 A | | 8/1989 | Kahn et al. |
| 4,988,529 A | | 1/1991 | Nakaya et al. |
| 5,345,781 A | | 9/1994 | Fels |
| 5,478,587 A | | 12/1995 | Mingione |
| 5,518,753 A | * | 5/1996 | Bracco et al. ................. 426/601 |
| 5,605,712 A | | 2/1997 | Bertrand et al. |
| 5,698,247 A | | 12/1997 | Hall |
| 6,200,622 B1 | | 3/2001 | Darling et al. |
| 6,558,729 B1 | * | 5/2003 | Riviere et al. ................. 426/565 |
| 7,435,435 B2 | | 10/2008 | Seven et al. |
| 7,579,032 B2 | | 8/2009 | Lee et al. |
| 2002/0001656 A1 | | 1/2002 | Mason et al. |
| 2003/0003215 A1 | | 1/2003 | Huang et al. |
| 2003/0185962 A1 | | 10/2003 | Watanabe |
| 2004/0071835 A1 | | 4/2004 | Bartowska et al. |
| 2005/0037111 A1 | | 2/2005 | Berry |
| 2005/0042333 A1 | | 2/2005 | Bartkowska |
| 2006/0008557 A1 | | 1/2006 | Vanitallie et al. |
| 2006/0233932 A1 | | 10/2006 | Quail |
| 2006/0233933 A1 | | 10/2006 | Berry |

FOREIGN PATENT DOCUMENTS

| | | |
|---|---|---|
| DE | 10016786 | 4/2000 |
| DE | 10016786 | 12/2000 |
| EP | 1031288 | 8/2000 |
| EP | 1051913 | 11/2000 |
| EP | 1212948 | 12/2002 |
| EP | 1400176 A1 | 3/2004 |
| EP | 1158862 | 5/2005 |
| EP | 1709875 | 10/2006 |
| EP | 1716762 | 11/2006 |
| EP | 1 738 650 A | 1/2007 |
| EP | 1929879 | 6/2008 |
| FR | 2791870 | 10/2000 |
| FR | 2791870 A | 10/2000 |
| GB | 528397 | 5/1939 |
| JP | 57036944 | 2/1982 |
| JP | 57068742 | 4/1982 |
| JP | 05030902 | 2/1993 |
| JP | 2003250455 | 9/2003 |
| WO | WO9634537 | 11/1996 |
| WO | WO9704663 | 2/1997 |
| WO | WO9716980 | 5/1997 |
| WO | WO9730600 | 8/1997 |
| WO | WO0072697 | 12/2000 |
| WO | WO2005013713 | 2/2005 |
| WO | WO2006007922 | 1/2006 |
| WO | WO2006007923 | 1/2006 |

(Continued)

OTHER PUBLICATIONS

Arbuckle, Ice Cream, Ice Cream, 1972, 240-242; 284-285, ., The AVI Publishing Company, Inc., Westport,CT.
Arbuckle, The Hardening Process, Ice Cream 1986 p. 262, 1986, 262, ., Van Reinhold Co.
Bolliger et al., Influence of emulsifiers on ice cream produced by conventional freezing and low-temperature extrusion processing, International Dairy Journal 2000 10 pp. 597-504, Jun. 18, 2000, 497-504, 10, Elsevier Ltd.
Clarke, The Science of Ice Cream, Royal Society of Chemistry 2004 pp. 46-48, 62-73, 77, 168, 2004, 46-48, 62-73, 77, 168.
Gunstone et al, Major oils from plant sources, The Lipid Handbook, 2007, 66-67 and 71-72, 3rd Edition, US.
Marshall et al, Ice Cream, Ice Cream 6th Edition, 2003, 36, 42-43 and 69, ., US.

(Continued)

*Primary Examiner* — Kelly Bekker
(74) *Attorney, Agent, or Firm* — Gerard J. McGowan, Jr.

(57) ABSTRACT

A frozen aerated confection is provided, comprising water; a fat component in an amount of 1 to 15% by weight of the frozen aerated confection wherein greater than 20% and less than 35% by weight of the fatty acids in the fat component are polyunsaturated, and less than 65% by weight of the fatty acids are saturated; mammalian milk protein; and sweetener; characterized in that the frozen confection contains less than 0.04% emulsifier by weight of the frozen confection. A process for manufacturing such a frozen aerated confection is also provided.

14 Claims, 8 Drawing Sheets

(56) References Cited

FOREIGN PATENT DOCUMENTS

| WO | 2006/017228 A2 | 2/2006 |
| WO | 2007/072184 A | 6/2007 |

OTHER PUBLICATIONS

Marshall, The Freezing Process, Ice Cream 2003 Chapter 7 p. 190, 2003, 190.

Sandstrom et al., Methods for Studying Mineral and Trace Element Absorption in Humans Using Stable Isotopes, Nutrition Research Reviews, 1993, 71-95, 6.

Shahidi, Ed, Edible Oil and Fat Products: Chemistry, Properties, and Health Effects, Bailey's Industrial Oil and Fat Products 2005 p. 568, 2005, 568, ., John Wiley & Sons, Inc.

W. S. Arbuckle, Stabilizers and Emulsifiers, Ice Cream, 1972, 96, ., The AVI Publishing Company, Inc.

Wesley, Osmolality—A novel and sensitive tool for detection of tampering of beverages adulterated with ethanol, γ-butyrolactone, and 1,4-butanediol . . . , Microgram Journal 2003 1-2 pp. 8-17, 2003, 8-17, 1-2.

WHO/FAO Expert Consultation, Diet, Nutrition and the Prevention of Chronic Diseases, WHO Technical Report Series, 2003, 1-160, 916, CH.

European Search Report Application No. EP 07118669 dated Jan. 28, 2008, pp. 1-2.

European Search Report Application No. EP06122552 dated Jun. 8, 2007, pp 1-2.

XP002436754 & JP 2006 136306 A (Fukaya), Jun. 2006, Derwent Publications Ltd., GB, 2006-369614, abstract only p. 1.

Laid-Open Patent Gazette, Japanese Patent Office, Laid-Open No. 2006/136,306, Jun. 2006, pp. 1-9.

* cited by examiner

FROZEN AERATED CONFECTIONS AND METHODS FOR PRODUCTION THEREOF

TECHNICAL FIELD OF THE INVENTION

The present invention relates to frozen aerated confections, such as ice cream. In particular, it relates to frozen aerated confections that contain oils which are low in saturated fat, such as rapeseed oil.

BACKGROUND TO THE INVENTION

Frozen aerated confections, such as ice creams, sorbets and the like are popular foodstuffs. Typically they are aerated to an overrun of about 100%. Fat is an important constituent of such confections. Conventionally, frozen aerated confections have been prepared with fats having a high proportion of saturated fat, for example dairy fat (60-65%) or coconut oil (90%), together with emulsifiers such as mono/di-glycerides of fatty acids. Typically the emulsifiers are present at about 0.1% by weight of the confection. Saturated fats are conventionally used because they are mostly solid at the temperatures at which freezing and aeration take place in an ice cream freezer. The presence of solid fat together with an emulsifier results in ice cream that can be aerated uniformly and consistently, holds its shape after extrusion and has a good texture when eaten (see for example, "Ice Cream", $6^{th}$ Edition R. T. Marshall, H. D. Goff and R. W. Hartel, Kluwer Academic/Plenum Publishers, New York 2003, pages 36, 42-43 and 69; or "The Science of Ice Cream", C. Clarke, Royal Society of Chemistry, Cambridge, 2004, pages 46-48 and 62-73). Shape formation and retention is a critical factor in producing products which are shaped on extrusion, for example Viennetta™. Such products cannot normally be produced with a low level of solid fat, because liquid fat produces an unstable air phase resulting in uneven aeration and poor shaping properties.

Health-conscious consumers are now looking for frozen aerated confections which have all the properties of these traditional products but which are healthier. It has therefore been proposed to produce frozen aerated confections in which saturated fats are replaced by mono- or polyunsaturated fats. U.S. Pat. No. 5,478,587 discloses compositions useful for preparing frozen desserts based on a non-dairy creamer containing canola (rapeseed) oil and mono-/di-glycerides. Although the composition is said to be useful for preparing frozen desserts, none are exemplified. It has not been possible simply to replace the saturated fats in ice cream formulations with unsaturated fats (which are liquid at ambient temperatures) and obtain the desired shaping properties and consistency of aeration, because unsaturated fats do not contain sufficient solid fat. Thus there remains a need to provide frozen aerated confections containing low levels of saturated fats which have good aeration and shaping properties.

TESTS AND DEFINITIONS

Unless defined otherwise, all technical and scientific terms used herein have the same meaning as commonly understood by one of ordinary skill in the art (e.g. in frozen food manufacture). Definitions and descriptions of various terms and techniques used in frozen confectionery manufacture are found in "Ice Cream", $6^{th}$ Edition. With the exception of percentages cited in relation to the overrun, all percentages, unless otherwise stated, refer to the approximate percentage by weight of the total composition.

Frozen Aerated Confection

The term "frozen aerated confection" as used in this specification means a sweet-tasting fabricated foodstuff intended for consumption in the frozen state (i.e. under conditions wherein the temperature of the foodstuff is less than 0° C., and preferably under conditions wherein the foodstuff comprises a significant amount of ice). Frozen aerated confections are made by freezing a pasteurised mix of ingredients. Overrun is typically produced by intentionally incorporating gas into the product, such as by mechanical agitation. The gas can be any food-grade gas such as air, nitrogen or carbon dioxide. Typical examples of frozen aerated confections include ice creams.

Fat

Fats are largely made up of triglycerides (approximately 98%), together with minor amounts of other components such as phospholipids and diglycerides. Triglycerides are esters of glycerol with three fatty acids. Fatty acids which have no carbon-carbon double bonds are said to be saturated (herein abbreviated as SAFA), whereas fatty acids that contain one or more carbon-carbon double bonds are said to be monounsaturated (abbreviated as MUFA) and polyunsaturated (PUFA) respectively. Fats that are liquid at ambient temperatures are often referred to as oils. In this specification the term "fat" includes such oils. The SAFA, MUFA and PUFA contents of fats and oils are given in "The Lipid Handbook", Second Edition, Authors Frank D Gunstone, John L Harwood, Fred B Padley, Published by Chapman & Hall 1994.

Oil bodies (also known as oleosomes, lipid bodies or spheresomes) are discrete subcellular structures found in the seeds of oilseed crops in which the oil is naturally encapsulated by a monolayer of phospholipids in which proteins (known as oleosins) are embedded. As used herein, the term fat refers to fats and oils extracted from such sources, and therefore does not include oil bodies.

Mammalian Milk-Proteins

Sources of mammalian milk protein include milk, concentrated milk, milk powders (such as skimmed milk powder), caseins, caseinates (such as sodium and/or calcium caseinates) whey, whey powders and whey protein concentrates/isolates. Sources of mammalian milk protein generally also comprise other materials. For example, skimmed milk powder typically comprises 37% milk protein, 55% lactose and 8% milk minerals. Cow milk is the preferred mammalian milk.

Sweetener

Sweetener means a mono-, di- or oligo-saccharide containing from three to twenty monosaccharide units joined in glycosidic linkage, or a corn syrup, or a sugar alcohol, or a mixture thereof. Sweeteners include sucrose, fructose, lactose (for example from the source of mammalian milk protein), dextrose, invert sugar, corn syrup, maltodextrin, oligofructose, inulins and sorbitol.

Free Sugars

The term "free sugars" is defined as in "Diet, nutrition and the prevention of chronic diseases"—*Report of a Joint WHO/FAO Expert Consultation*, WHO Technical Report Series 916, WHO, Geneva, 2003. Thus free sugars are all mono and disaccharides added by the manufacturer, cook or consumer plus sugar naturally present and sourced from honey, syrups and juices. Free sugars do not include sugars naturally present and sourced from fruit or mammalian milk.

Emulsifiers

Emulsifiers are described in "Ice Cream", $6^{th}$ Edition, pages 85-86. The term "emulsifier" as used herein includes mono- and di-glycerides of saturated or unsaturated fatty acids (e.g. monoglyceryl palmitate—MGP), polyoxyethylene derivatives of hexahydric alcohols (usually sorbitol), glycols, glycol esters, polyglycerol esters, sorbitan esters, stearoyl lactylate, acetic acid esters, lactic acid esters, citric acid esters, acetylated monoglyceride, diacetyl tartaric acid esters, polyoxyethylene sorbitan esters (such as polysorbate 80), sucrose esters, lecithin, egg, and egg yolk. The term also includes mixtures of any the above. However, the term "emulsifier" as used herein does not include mammalian milk proteins. As pointed out above, fats and oils may include small amounts of substances such as mono or diglycerides or phospholipids. The term "emulsifier" does not include such molecules when they are naturally present in the fat in small quantities.

Overrun

The overrun of ice cream (and other frozen aerated confections) is defined by $$\text{overrun \%} = \frac{\text{density of mix} - \text{density of ice cream}}{\text{density of ice cream}} \times 100$$

Overrun is measured (at atmospheric pressure) as follows. The density of the unaerated mix is determined by weighing a standard overrun cup containing mix at approximately 4° C., subtracting the mass of the cup and dividing by the known volume of the cup (density=mass/volume). A minimum of three repeat measurements is taken. The density of the (aerated) ice cream is determined by repeating the procedure using the same overrun cup with freshly drawn ice cream (at typically −5° C. to −6° C.). Again a minimum of three repeat measurements is taken. With knowledge of the density of both unaerated mix and aerated ice cream, the overrun can be calculated using the equation given above.

BRIEF DESCRIPTION OF THE INVENTION

We have now found that aerated frozen confections that have uniform aeration and good shaping properties can be prepared using a fat component that contains a substantial amount of polyunsaturated fat when the confection is substantially free from emulsifier. Accordingly, in a first aspect the present invention provides a frozen aerated confection comprising water; a fat component in an amount of 1 to 15% by weight of the frozen aerated confection wherein greater than 20% and less than 35% by weight of the fatty acids in the fat component are polyunsaturated, and less than 65% by weight of the fatty acids are saturated; mammalian milk protein; and sweetener; characterised in that the frozen confection contains less than 0.04% emulsifier by weight of the frozen confection.

Preferably the frozen aerated confection contains no emulsifier.

Preferably less than 55% by weight of the fatty acids are saturated fatty acids. In one preferred embodiment, the fat component comprises at least 80% by weight of rapeseed oil. In another preferred embodiment, the fat component comprises at least 80% by weight of a mixture of sunflower oil and coconut oil.

Preferably the fat component constitutes from 2 to 12% by weight of the frozen aerated confection.

Preferably the frozen aerated confection has an overrun of from 50 to 200%.

Preferably the mammalian milk protein constitutes from 1 to 8% by weight of the frozen aerated confection.

Preferably the mammalian milk is cow milk.

Preferably the frozen aerated confection contains less than 17% free sugars by weight of the frozen aerated confection.

In a second aspect, the present invention provides a process for manufacturing a frozen aerated confection comprising the steps of:
a) producing a mix comprising water; a fat component in an amount of from 1 to 15% by weight of the frozen aerated confection wherein greater than 20% and less than 35% by weight of the fatty acids in the fat component are polyunsaturated, and less than 65% by weight of the fatty acids are saturated; less than 0.04% emulsifier by weight of the frozen confection; mammalian milk protein; and sweetener;
b) homogenising and pasteurising the mix;
c) freezing and aerating the mix in an ice cream freezer to form a frozen aerated confection; and
d) drawing the frozen aerated confection from the ice cream freezer.

Preferably the frozen aerated confection is drawn from the ice cream freezer at a temperature of below −4.0° C.

DETAILED DESCRIPTION OF THE INVENTION

The fat component of the invention comprises greater than 20%, preferably greater than 22% and less than 35%, preferably less than 33% by weight polyunsaturated fatty acids. The fat component also comprises less than 65%, by weight saturated fatty acids, preferably less than 55%, very preferably less than 50%. In one embodiment, the fat component comprises less than 30%, preferably less than 20%, more preferably less than 10% SAFA. The lower the SAFA content, the greater the health benefit.

The fat component may comprise a single oil or a fraction or a mixture of oils provided that greater than 20% and less than 35% by weight of the fatty acids are polyunsaturated. Suitable fats that may be used on their own include those listed in Table 1. The exact fatty acid composition of liquid vegetable fats varies between sources and the numbers given are typically averages. Because of this, and because of rounding errors, the total MUFA+PUFA+SAFA may not be exactly 100% in every case.

TABLE 1

Some suitable oils and fractions

| | SAFA | MUFA | PUFA |
| --- | --- | --- | --- |
| Rapeseed oil (canola) | 8 | 62 | 30 |
| Peanut oil | 19 | 49 | 32 |
| Mid-oleic sunflower oil | 9 | 59 | 32 |
| Beech oil | 8 | 54 | 32 |
| Brazil oil | 24 | 48 | 24 |

Particularly preferred is rapeseed oil (also known as canola oil) owing to its high unsaturated fat content and wide availability.

It will be appreciated by those skilled in the art that the desired PUFA and SAFA amounts may be achieved when mixing two fats when one component of the mixture has a high saturated fat content and the other has a high unsaturated fat content. Examples of suitable mixtures include mixtures of coconut oil (CNO) with sunflower oil (SFO) and/or rapeseed oil (RPO). Coconut oil contains 92% SAFA, 6% MUFA and 2% PUFA Sunflower oil contains 11% SAFA, 25% MUFA and 64% PUFA. Some specific examples of such mixtures are given in Table 2 by way of example only but it will be appreciated by those skilled in the art that mixtures having different proportions of the SFO, RPO, CNO could be formulated to have the desired PUFA and SAFA contents. It is also possible to add other fats for example olive oil (OV) and/or palm oil (PO). It will also be appreciated that all or part of the oils identified in Table 2 could be replaced by other fats or that other fats may be added in addition to those blends identified in Table 2, provided that the PUFA and SAFA levels are in accordance with the invention. Indeed, many other combinations are possible as will be apparent to those skilled in the art

TABLE 2

Some suitable blends

| SFO | RPO | CNO | Other fat | SAFA | MUFA | PUFA |
|-----|-----|-----|-----------|------|------|------|
| 50  | 0   | 50  | 0         | 52   | 15   | 33   |
| 40  | 20  | 40  | 0         | 43   | 25   | 32   |
| 30  | 40  | 30  | 0         | 34   | 34   | 32   |
| 20  | 60  | 20  | 0         | 25   | 43   | 32   |
| 10  | 80  | 10  | 0         | 17   | 53   | 31   |
| 30  | 0   | 0   | 70 OV     | 13   | 62   | 25   |
| 40  | 0   | 0   | 60 OV     | 13   | 57   | 30   |
| 30  | 0   | 0   | 70 PO     | 39   | 34   | 27   |
| 40  | 0   | 0   | 60 PO     | 35   | 33   | 32   |
| 10  | 80  | 0   | 10 PO     | 13   | 56   | 32   |
| 35  | 0   | 30  | 35 OV     | 36   | 38   | 26   |
| 40  | 0   | 0   | 30 OV + 30 PO | 24 | 45 | 31 |

Particularly preferred are blends of sunflower oil and coconut oil owing to their clean flavour and wide availability.

Preferably the frozen confection comprises at least 2% fat by weight of the confection, more preferably at least 5%. Preferably the frozen confection comprises at most 12% fat by weight of the confection, more preferably at most 10%.

Preferably the frozen aerated confection comprises less than 0.02%, more preferably less than 0.01% total emulsifier by weight of the frozen confection. Most preferably, the frozen aerated confection contains no emulsifier. In the presence of a fat component according to the invention, emulsifiers have been found to produce frozen aerated confections with poor aeration and shaping properties. Emulsifiers can also detract from the natural image of the product.

Preferably the frozen confection has an overrun of at least 50%, more preferably at least 80%. It is preferable that the overrun does not exceed 150%, however, otherwise the confection does not exhibit the cold mouth-feel conventionally associated with frozen confections. More preferably the overrun is less than 120%.

In order to aid in aeration during manufacture of the frozen confection it is preferable that the confection comprises mammalian milk protein in an amount of at least 1% by weight of the frozen confection, more preferably greater than 2%. In order to prevent the confection from exhibiting a chalky mouth-feel, however, it is also preferable that the protein content is less than 8%, more preferably less than 6% by weight of the frozen confection. Mammalian milk proteins provide good flavour, heat stability and surface activity.

Preferably the frozen confection contains less than 1 wt %, preferably less than 0.5 wt %, more preferably less than 0.2 wt % of surface active proteins or protein derivatives (other than mammalian milk protein), for example soy protein and whipping agents derived from soy protein. It is believed that such proteins may have a similar effect to emulsifiers and therefore detrimentally affect the aeration and shaping properties. In a preferred embodiment, the frozen confection comprises substantially no protein other than mammalian milk proteins.

In order to provide the customary sweetness associated with frozen aerated confections and to avoid the confection being unduly hard, it is preferable that the frozen aerated confection comprises sweeteners in an amount of at least 5% by weight of the frozen confection, more preferably at least 10%, most preferably at least 15%. To avoid the frozen aerated confection being too sweet, the amount of sweeteners should be at most 35%, preferably at most 30%, most preferably at most 25% by weight of the confection.

A preferred sweetener is lactose, especially when added as part of the milk solids. This is because lactose has a relatively low molecular weight (and therefore provides excellent freezing point depression) but is neither overly sweet nor counted among the unhealthy free sugars (when added as part of the milk solids). Thus it is preferable that lactose is present in an amount of at least 3% by weight of the frozen confection, preferably at least 4%. In order to avoid crystallisation of the lactose, however, it is also preferred that the lactose is present in an amount of less than 9%, preferably less than 8% by weight of the frozen confection.

In order to increase the appeal of the frozen aerated confection to health conscious consumers, it is preferable that the amount of free sugars is less than 17% by weight of the frozen aerated confection, preferably less than 15%.

The frozen aerated confections may include stabilisers, such as alginates, gum arabic, gum ghatti, gum karaya, gum tragacanth, locust bean gum, carrageenans, xanthan gum, guar gum, gelatine, agar, sodium carboxymethylcellulose, microcrystalline cellulose, methyl and methylethyl celluloses, hydroxypropyl and hydroxypropylmethyl celluloses, low and high methoxyl pectins and mixtures thereof.

The frozen aerated confections may also include other ingredients typically found in such confections, for example colours and flavours.

Frozen aerated confections may be produced by any suitable process. In particular, they may be produced by a process comprising the steps of:

a) producing a mix comprising water; a fat component in an amount of from 1 to 15% by weight of the frozen aerated confection wherein greater than 20% and less than 35% by weight of the fatty acids in the fat component are polyunsaturated; less than 0.04% emulsifier by weight of the frozen confection; mammalian milk protein; and sweetener;

b) homogenising and pasteurising the mix;

c) freezing and aerating the mix in an ice cream freezer to form a frozen aerated confection; and d) drawing the frozen aerated confection from the ice cream freezer.

Preferably the process further comprises hardening the frozen aerated confection after step (d). Typically the hardening temperature is from −17 to −40° C., preferably −20 to −35° C.

Preferably the frozen aerated confection is drawn from the ice cream freezer at a temperature of below −4.0° C., more preferably below −5.0° C., −6.0° C.-7.0° C. or −7.5° C., most preferably below −8.0° C. The lower the temperature at which the frozen aerated confection is drawn from the freezer, the slower the meltdown of the hardened frozen aerated confection. By "meltdown" is meant the rate at which the frozen aerated confection melts in a constant temperature environment, measured in terms of mass loss over time, as follows. Stainless steel wire mesh grids having a size of 25×25 cm, with 3 mm holes, 1 mm thick wire are placed on a 60° funnel with a bore size of 2 cm suspended over a collecting vessel (of large enough volume to collect the entire sample tested). The collecting vessel is placed on a balance for weighing the material collected in the vessel. The balances are connected to a data logging system to record the mass collected. The apparatus consisting of grid, funnel, vessel and balance, is contained in a cabinet set at a constant temperature of 20° C. The cabinet is capable of holding up to 12 of these sets of apparatus simultaneously. Samples in the form of rectangular blocks measuring 14.5×9×3.8 cm are equilibrated in a freezer at −25° C., and then weighed on a zeroed balance with the grid (one of the largest flat faces of the sample is in contact with the grid). The samples are then arranged randomly over the available positions in the meltdown cabinet. Once all samples are in place on the funnels, the data logging system records the amount of collected material every minute. From the mass of the sample collected over this period, the percentage mass loss of the samples is calculated using the following formula.

$$\% MassLoss = \frac{M_t - M_0}{F} \times 100$$

wherein:
$M_t$=mass recorded on the balance (gram) at time t minute
$M_0$=mass recorded on the balance (gram) at start of analysis, t=0 minute
F=Initial mass of product (gram).

The present invention will be further described in the following examples which are illustrative only and non-limiting, and by reference to the figures wherein.

Examples 1, 2, A, B

Ice cream mixes were prepared from four different ice cream formulations shown in Table 3. Examples 1 and 2 are examples according to the invention. The fat source in example 1 is a 50/50 blend of coconut oil and sunflower oil, and in example 2 it is rapeseed oil. Comparative examples A and B have the same formulations as examples 1 and 2 respectively, but contain emulsifier.

TABLE 3

| | Formulations | | | |
|---|---|---|---|---|
| Ingredient (wt %) | Example 1 | Comp Ex A | Example 2 | Comp Ex B |
| Skimmed cow milk powder | 10 | 10 | 10 | 10 |
| HP60 emulsifier | — | 0.2 | — | 0.2 |
| Coconut oil | 4 | 4 | — | — |
| Sunflower oil | 4 | 4 | — | — |
| Rapeseed oil | — | — | 8 | 8 |
| Sucrose | 13 | 13 | 13 | 13 |
| MD40 | 4 | 4 | 4 | 4 |
| Vanillin | 0.012 | 0.012 | 0.012 | 0.012 |
| Carrageenan L100 | 0.016 | 0.016 | 0.016 | 0.016 |
| Locust bean gum | 0.144 | 0.144 | 0.144 | 0.144 |
| Water | 64.828 | 64.628 | 64.828 | 64.628 |

HP60 emulsifier is a saturated mono-diglyceride containing 60% monoglyceride, supplied by Danisco. MD40 s C*Dry GL 01934 dried glucose syrup containing 5% water, 36.5% mono and disaccharides and 58.5% other solids, supplied by Cerestar.

The mixes were prepared as follows. Water at 75-80° C. was added into a tank equipped with a turbo mixer. The dry ingredients, except the milk powder, were mixed together and added to the tank followed by the cow milk powder and then the fat, which had been pre-melted if necessary. The mix was blended for 5-10 minutes at 60-70° C. The mix was then homogenised at 140 bar and pasteurised at 82° C. for 25 seconds in a plate heat exchanger and aged overnight at 4° C. before processing.

Ice creams were prepared by freezing and aerating under shear. The mix was frozen and aerated to a target overrun of 100% using a scraped surface heat exchanger (Technohoy MF75). The ice cream was extruded at about −5.7° C. through a nozzle with a triangular cross-section. On leaving the nozzle, ice cream portions were cut, collected on pre-cooled trays, hardened at −35° C. for 3 hours and then stored at −25° C.

Figure 1:
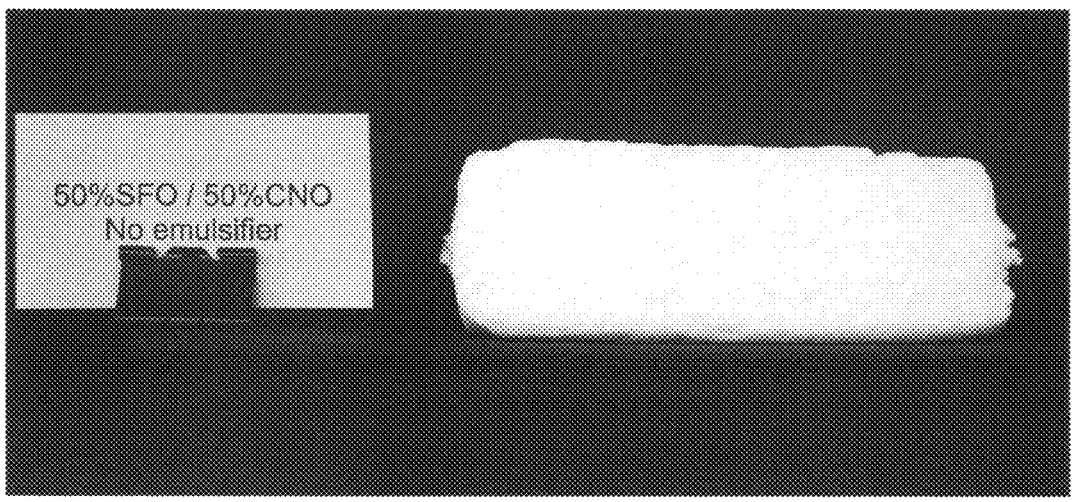
FIG. 1 is a photograph of an ice cream of Example 1 after hardening.
Figure 1:
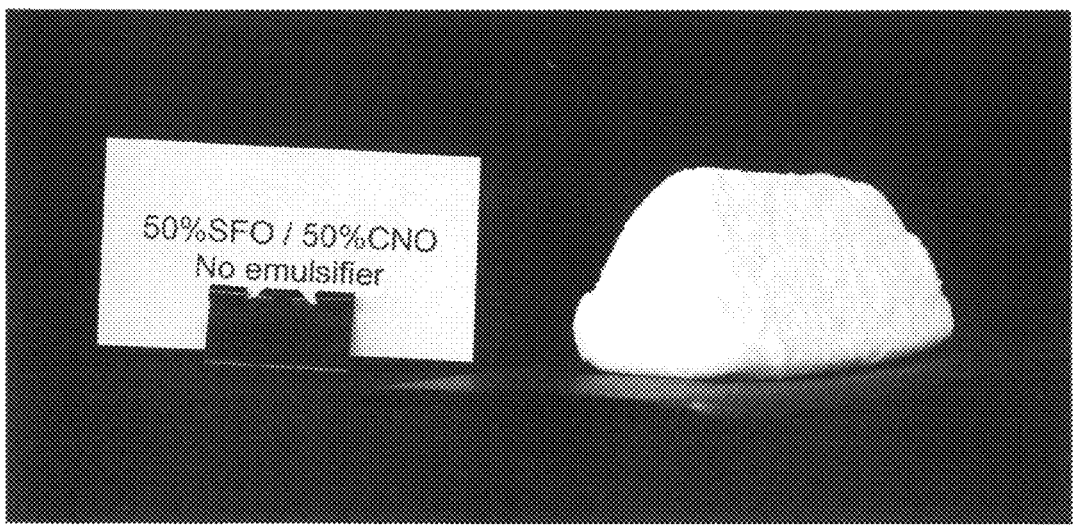
Figure 2:
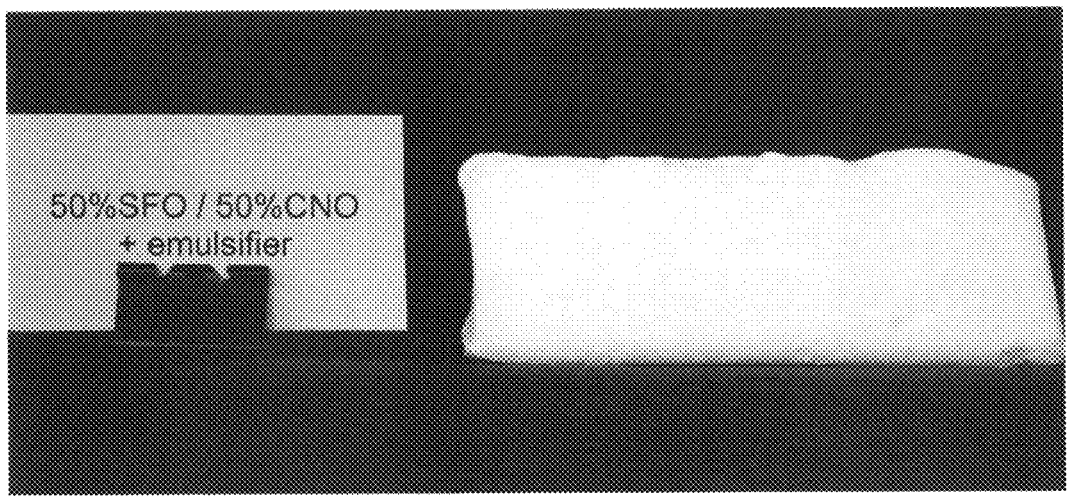
FIG. 2 is a photograph of an ice cream of Comparative Example A after hardening.
Figure 2:
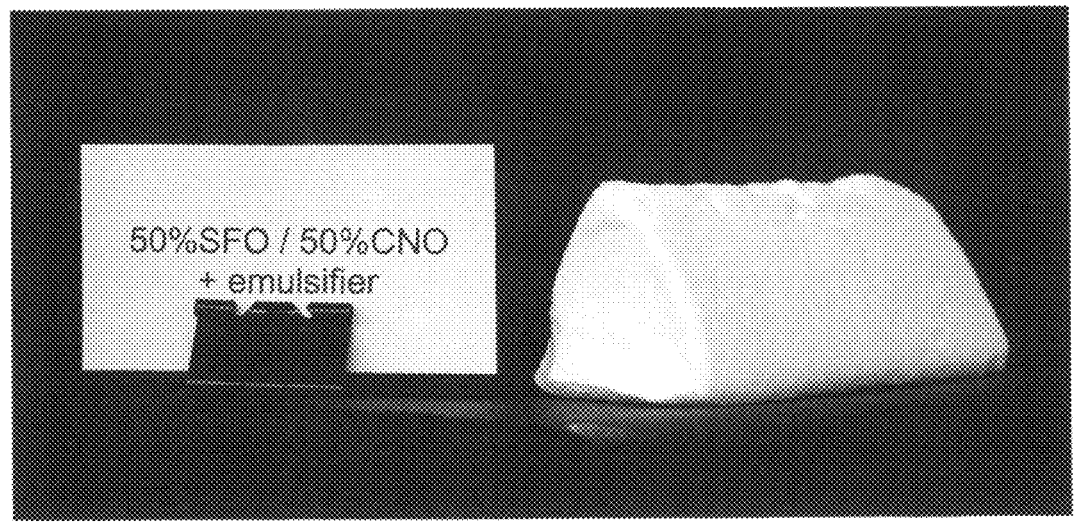
Figure 3:
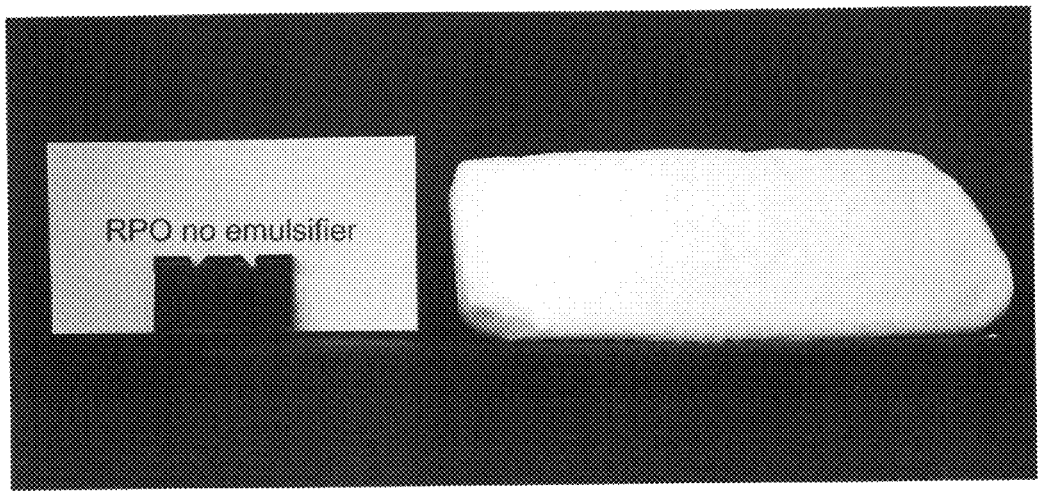
FIG. 3 is a photograph of an ice cream of Example 2 after hardening.
Figure 3:
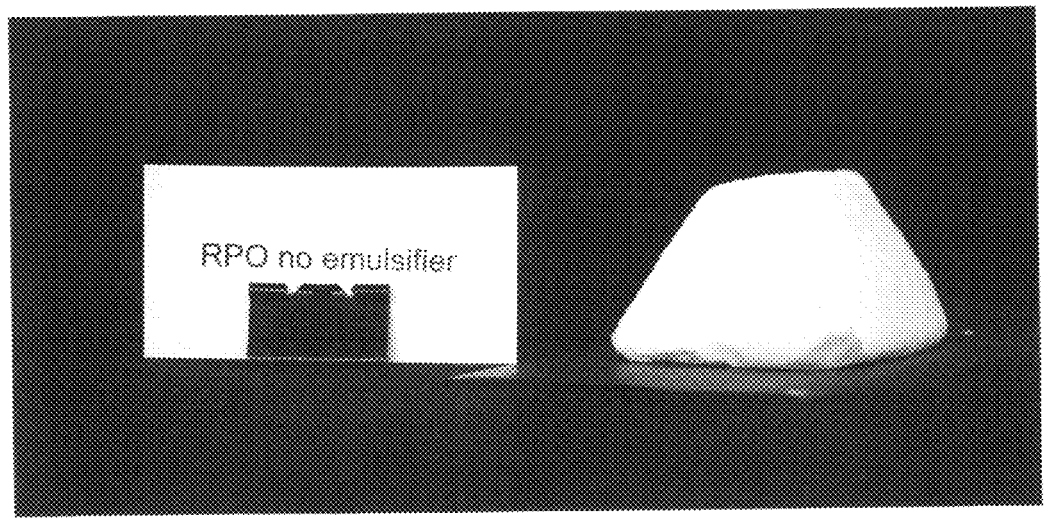
Figure 4:
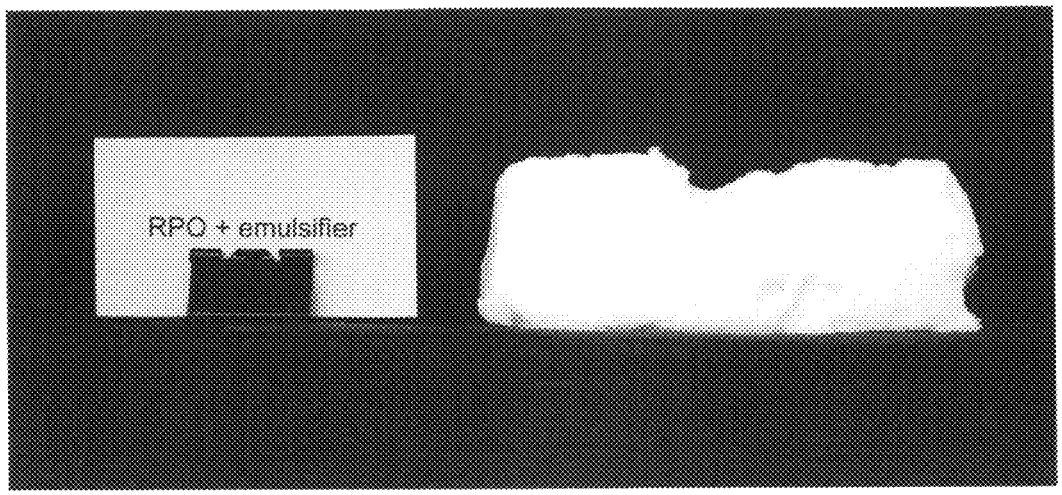
FIG. 4 is a photograph of an ice cream of Comparative Example B hardening.
Figure 4:
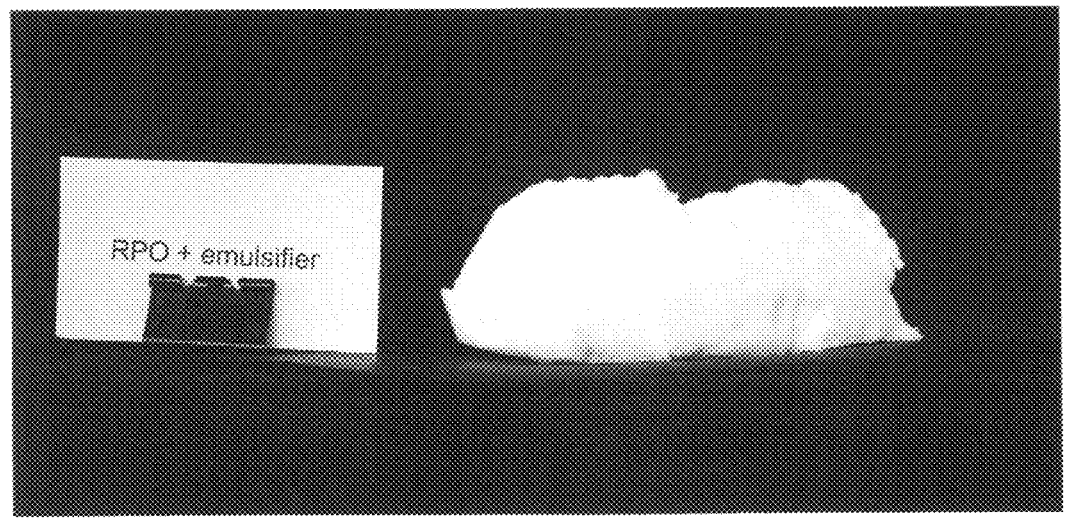

The samples were inspected for (a) shape, in particular the sharpness of the ridge on the top of the triangular samples and (b) uniformity of aeration—non-uniform aeration is indicated by visible air pockets on the surface of the ice cream. The overrun of the samples was also measured on leaving the freezer as described above. Photographs of the ice creams are shown in FIGS. 1 to 4 and the observations and results are summarized in Table 4.

TABLE 4

| | Results | | | |
|---|---|---|---|---|
| | Ex 1 | Comp Ex A | Ex 2 | Comp Ex B |
| Overrun (%) | 103 | 103 | 95-102 | 92-102 |
| Shape | Good | Poor | Good | very poor |
| Aeration | Few air pockets | Lots of air pockets | Very few air pockets | Lots of large air pockets |

The difference between example 2 and comparative example B was more pronounced than the difference between example 1 and comparative example A. This is because example 2/comparative example B contains fat having a very high degree of unsaturation, and hence the problems of poor aeration and shape loss are particularly severe.

These examples show that frozen aerated confections that have uniform aeration and good shaping properties can be prepared using unsaturated fats, provided that emulsifier is not used.

Examples 3, 4, C, D

Ice cream mixes were prepared from four different ice cream formulations shown in Table 5. Examples 3 and 4 are examples according to the invention. The fat source in example 3 is a 70/30 blend of olive oil and sunflower oil, and in example 4 it is a 60/20/20 blend of rapeseed oil, sunflower oil and coconut oil. Comparative examples C and D have the same formulations as examples 3 and 4 respectively, but contain emulsifier.

TABLE 5

Formulations of Examples 3, 4, C and D

| Ingredient (wt %) | Example 3 | Comp Ex C | Example 4 | Comp Ex D |
|---|---|---|---|---|
| Skimmed milk powder | 10 | 10 | 10 | 10 |
| HP60 emulsifier | — | 0.2 | — | 0.2 |
| Olive oil | 5.6 | 5.6 | — | — |
| Sunflower oil | 2.4 | 2.4 | 1.6 | 1.6 |
| Rapeseed oil | — | — | 4.8 | 4.8 |
| Coconut oil | — | — | 1.6 | 1.6 |
| Sucrose | 13 | 13 | 13 | 13 |
| MD40 | 4 | 4 | 4 | 4 |
| Vanillin | 0.012 | 0.012 | 0.012 | 0.012 |
| Carrageenan L100 | 0.016 | 0.016 | 0.016 | 0.016 |
| Locust bean gum | 0.144 | 0.144 | 0.144 | 0.144 |
| Water | 64.828 | 64.628 | 64.828 | 64.628 |

The samples are produced in analogy to those of Examples 1, 2, A and B.

Figure 5:
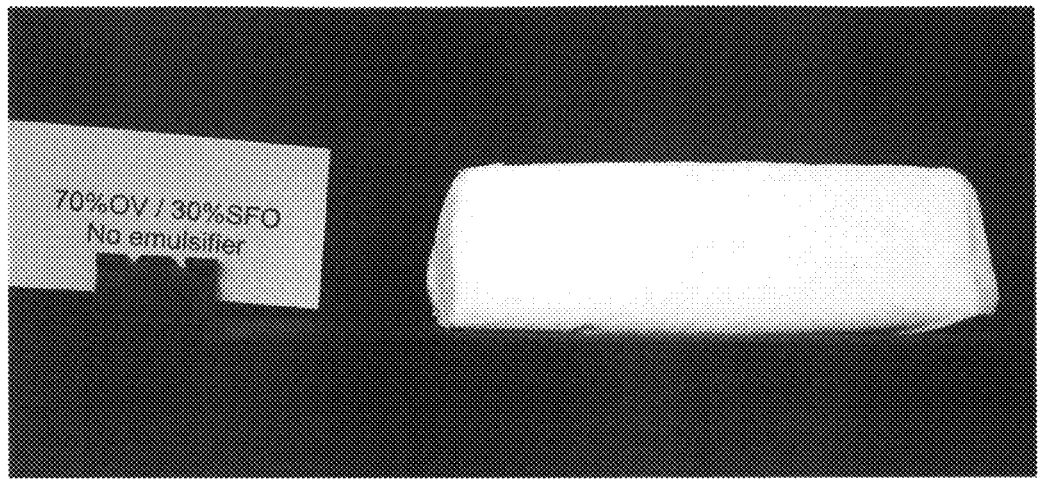
FIG. 5 is a photograph of an ice cream of Example 3 after hardening.
Figure 5:
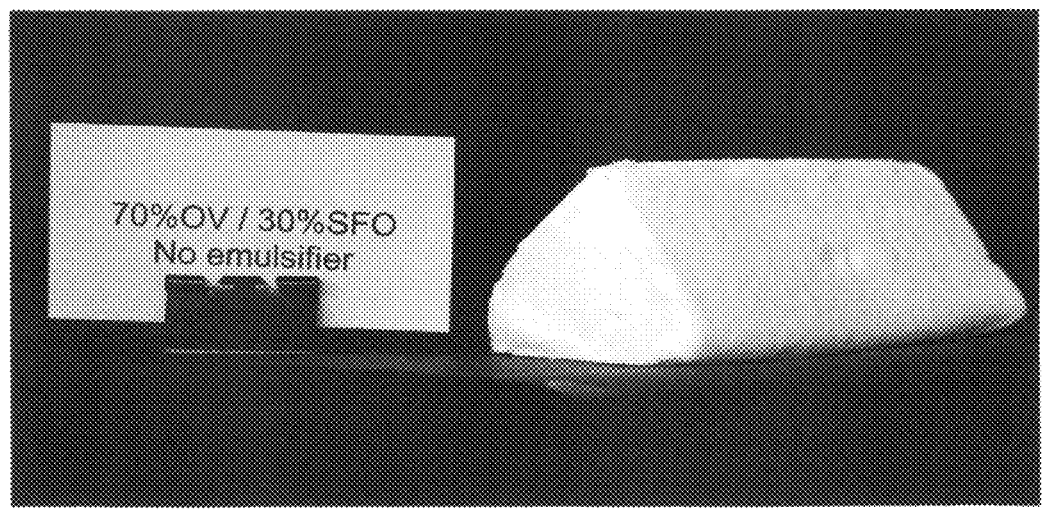
Figure 6:
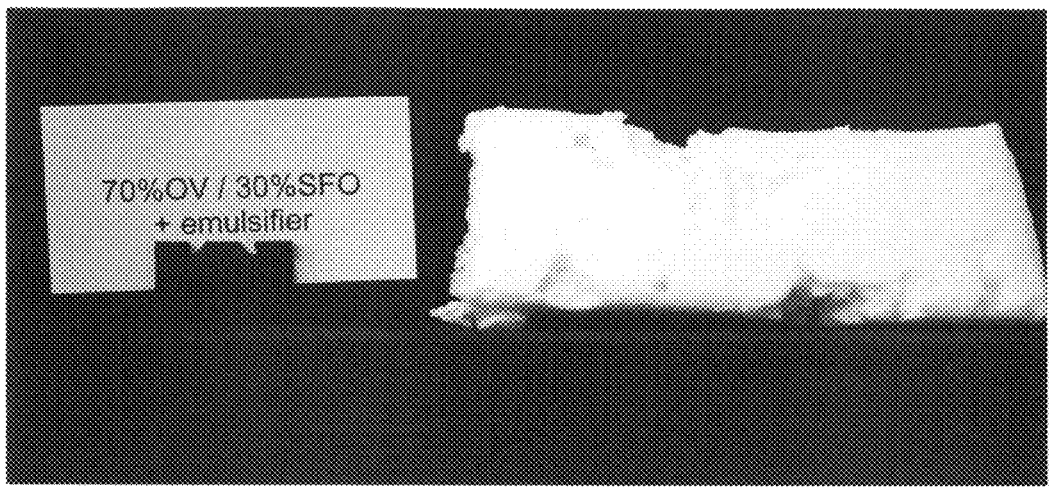
FIG. 6 is a photograph of an ice cream of Comparative Example C after hardening.
Figure 6:
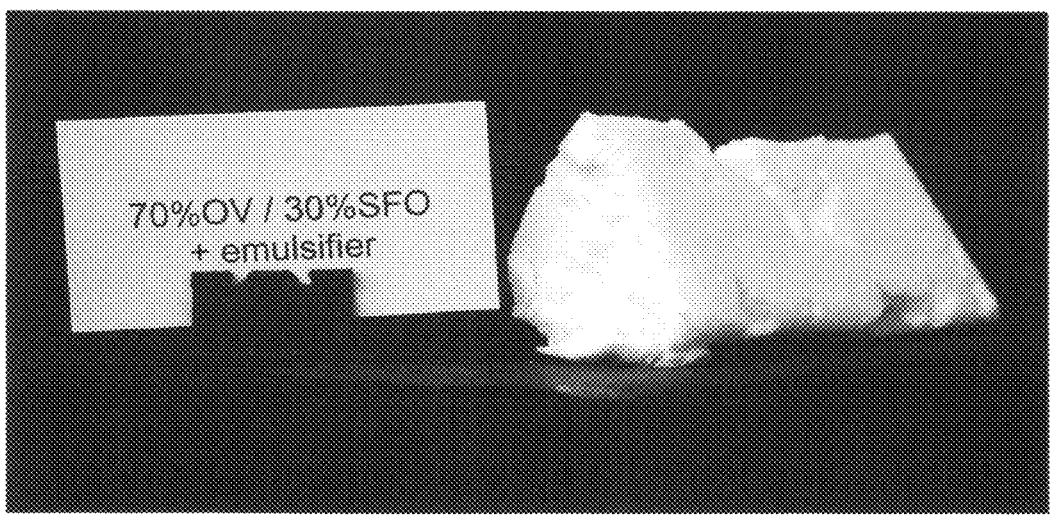
Figure 7:
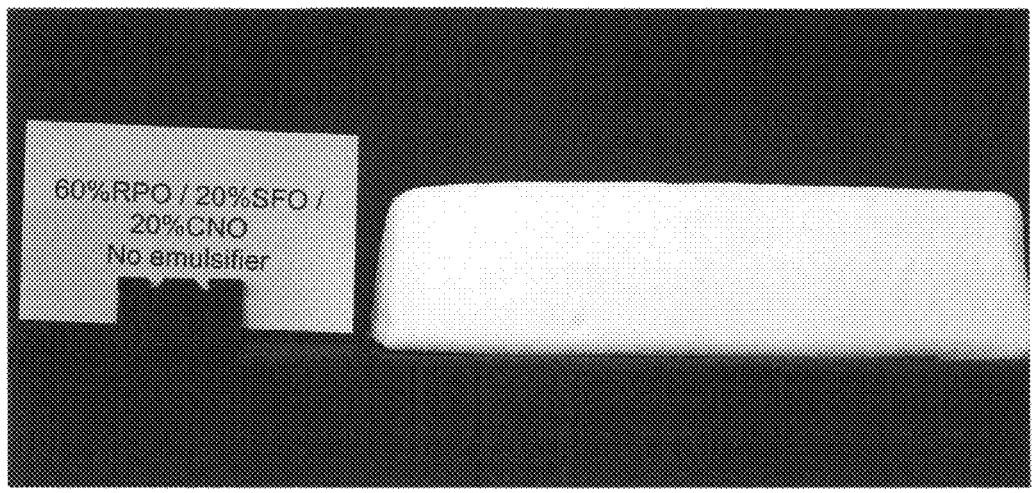
FIG. 7 is a photograph of an ice cream of Example 4 after hardening.
Figure 7:
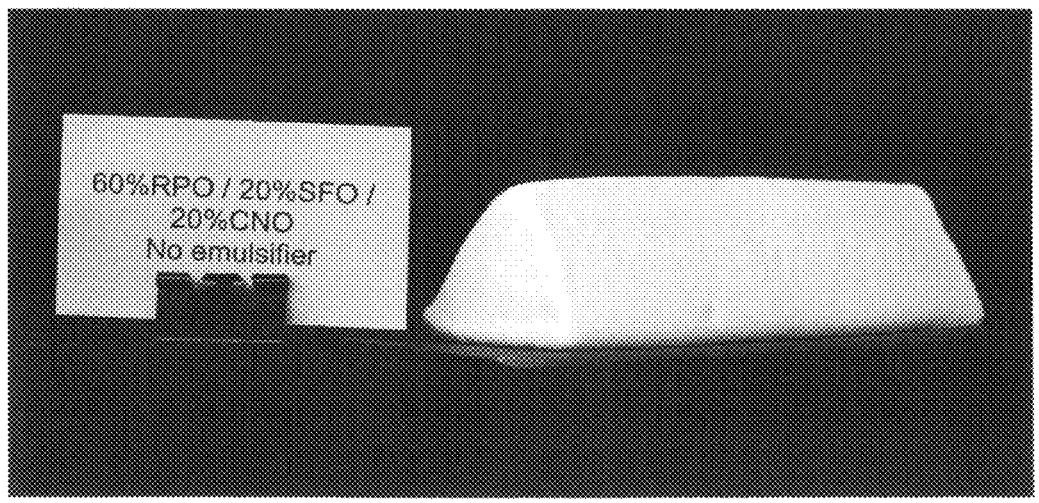
Figure 8:
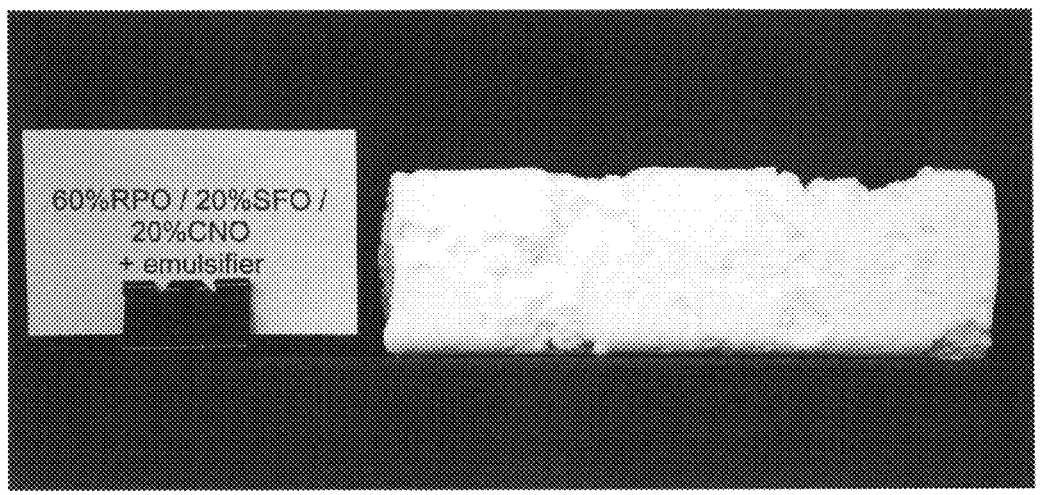
FIG. 8 is a photograph of an ice cream of Comparative Example D after hardening.
Figure 8:
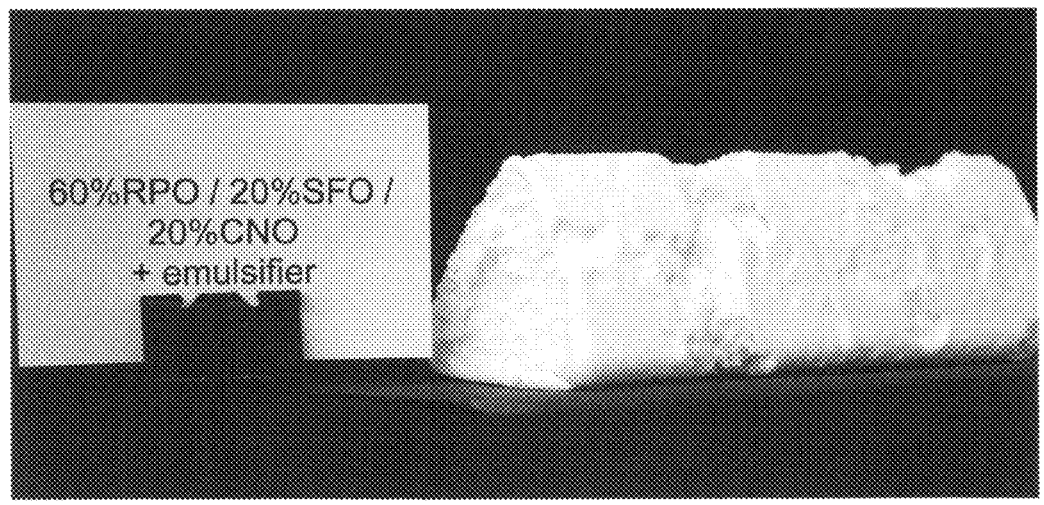

Photographs of the ice creams obtained from Examples 3, 4, C and D are shown in FIGS. 5 to 8 and the observations and results are summarized in Table 6.

TABLE 6

Results

| | Ex 3 | Comp Ex C | Ex 4 | Comp Ex D |
|---|---|---|---|---|
| Overrun (%) | 96-102 | 94-98 | 99-102 | 106 |
| Shape | Good | Very poor | Good | Very poor |
| Aeration | Just odd small air pocket | Lots of large air pockets | No air pockets | Lots of large air pockets |

The various features of the embodiments of the present invention referred to in individual sections above apply, as appropriate, to other sections mutatis mutandis. Consequently features specified in one section may be combined with features specified in other sections as appropriate.

All publications mentioned in the above specification are herein incorporated by reference. Various modifications and variations of the described methods and products of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the following claims.

The invention claimed is:

1. A frozen aerated confection comprising water; a fat component in an amount of 1 to 15% by weight of the frozen aerated confection wherein greater than 20% and less than 35% by weight of the fatty acids in the fat component are polyunsaturated, and 30 to less than 65% by weight of the fatty acids are saturated; mammalian milk protein; and sweetener; wherein the frozen confection contains less than 0.04% emulsifier by weight of the frozen confection and wherein the fat component comprises at least 80% by weight of a mixture of sunflower oil and coconut oil, said confection being extruded and having good shape and uniform aeration.

2. A frozen aerated confection according to claim 1 which contains no emulsifier.

3. A frozen aerated confection according to claim 1 wherein 30 to less than 55% by weight of the fatty acids are saturated fatty acids.

4. A frozen aerated confection according to claim 1 wherein 30 to less than 50% by weight of the fatty acids are saturated fatty acids.

5. A frozen aerated confection according to claim 1 wherein the fat component constitutes from 2 to 12% by weight of the frozen aerated confection.

6. A frozen aerated confection according to claim 1 having an overrun of from 50 to 200%.

7. A frozen aerated confection according to claim 1 wherein the mammalian milk protein constitutes from 1 to 8% by weight of the frozen aerated confection.

8. A frozen aerated confection according to claim 1 wherein the frozen confection comprises substantially no protein other than mammalian milk proteins.

9. A frozen aerated confection according to claim 1 wherein the free sugars constitute less than 17% by weight of the frozen aerated confection.

10. A process for manufacturing a frozen aerated confection comprising the steps of:
  a) producing a mix comprising water; a fat component in an amount of from 1 to 15% by weight of the frozen aerated confection wherein greater than 20% and less than 35% by weight of the fatty acids in the fat component are polyunsaturated, and 30 to less than 65% by weight of the fatty acids are saturated; less than 0.04% emulsifier by weight of the frozen confection; mammalian milk protein; and sweetener;
  b) homogenising and pasteurising the mix;
  c) freezing and aerating the mix in an ice cream freezer to form a frozen aerated confection; and
  d) drawing the frozen aerated confection from the ice cream freezer; wherein the frozen aerated confection consists of the mix, optional flavoring, optional coloring, and optional stabilizers.

11. A process according to claim 10 wherein the frozen aerated confection is drawn from the ice cream freezer at a temperature of below −4.0° C.

12. The frozen aerated confection according to claim 7 wherein the frozen confection comprises substantially no protein other than mammalian milk proteins.

13. A frozen aerated confection comprising water; a fat component in an amount of 1 to 15% by weight of the frozen aerated confection wherein greater than 20% and less than 35% by weight of the fatty acids in the fat component are polyunsaturated, and 30 to less than 65% by weight of the fatty acids are saturated; mammalian milk protein; an overrun of at least 50%; and sweetener; wherein the frozen confection contains less than 0.04% emulsifier by weight of the frozen confection and wherein the fat component comprises at least 80% by weight of a mixture of sunflower oil and coconut oil and wherein the mammalian milk protein constitutes from 1 to less than 8% by weight of the frozen aerated confection and the frozen aerated confection comprises substantially no protein other than mammalian milk proteins, said confection being extruded and having uniform aeration.

14. The frozen aerated confection according to claim 13 wherein the mammalian milk protein is present at 1 to less than 6%.

* * * * *